United States Patent
Sinn et al.

(10) Patent No.: US 10,448,127 B1
(45) Date of Patent: Oct. 15, 2019

(54) NETWORK BASE SIGNAL DISTRIBUTION SYSTEM

(71) Applicant: Amazon Technologies, Inc., Seattle, WA (US)

(72) Inventors: Frederick David Sinn, Seattle, WA (US); Michael Bruce Lane, Seattle, WA (US); David John O'Meara, Seattle, WA (US); Alaa Adel Mahdi Hayder, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/933,179

(22) Filed: Mar. 22, 2018

(51) Int. Cl.
*H04J 14/00* (2006.01)
*H04Q 11/00* (2006.01)

(52) U.S. Cl.
CPC . *H04Q 11/0005* (2013.01); *H04Q 2011/0015* (2013.01); *H04Q 2011/0035* (2013.01)

(58) Field of Classification Search
CPC ....... H04Q 11/0005; H04Q 2011/0035; H04Q 2011/0015
USPC .......................................................... 398/45
See application file for complete search history.

(56) References Cited

U.S. PATENT DOCUMENTS

| | | | | |
|---|---|---|---|---|
| 2003/0206743 | A1* | 11/2003 | Yanagimachi | H04J 14/0208 398/100 |
| 2004/0151503 | A1* | 8/2004 | Kashima | H04B 10/25754 398/115 |
| 2011/0256837 | A1* | 10/2011 | McCorkle | H04B 1/408 455/78 |
| 2013/0251364 | A1* | 9/2013 | Pachnicke | H04J 14/0227 398/32 |
| 2016/0337041 | A1* | 11/2016 | Wen | H04J 14/06 |

OTHER PUBLICATIONS

Song et al., "Plastic straw: future of high-speed signaling," *Scientific Reports*, pp. 1-8 (Nov. 3, 2015).

* cited by examiner

*Primary Examiner* — Don N Vo
(74) *Attorney, Agent, or Firm* — Klarquist Sparkman, LLP

(57) ABSTRACT

Communication systems include network nodes that distribute an electrical or optical base signal to remote nodes for modulation at the remotes nodes. A first waveguide is coupled to transmit data to a corresponding remote node, a second waveguide is coupled to receive remotely modulated data from the remote node, and a third waveguide is coupled to deliver the base signal to the remote node. Typically, the base signal is an optical signal from a laser diode, and optical fibers communicate modulated data signals and the base signal. A portion of the base signal can also be modulated for communication with remote nodes.

19 Claims, 6 Drawing Sheets

NETWORK BASE SIGNAL DISTRIBUTION SYSTEM

BACKGROUND

Optical interconnections provide secure, high bit rate communications between locations that can be in close proximity or distant from each other. Single mode fibers operating in the 1300 nm or 1550 nm windows are readily available, and a variety of laser sources and photodetectors have been developed for such applications. In typical examples, optical transmissions are produced by modulating an optical beam produced by a laser diode, and often, by direct modulation of laser drive current.

Current optical interconnections between network devices require that each end of the system have a laser that produces the optical beam which is modulated to transmit information. Such lasers are commonly packaged into the discrete optical modules based on such standards as SFP, SFP+, QSFP (Quad Small Form-factor Pluggable) and others.

While such configurations can provide satisfactory performance, they exhibit a number of significant drawbacks. Because modulation formats/rates are built-in to laser diode modules, increasing data rates to satisfy increasing demands for network services or to take advantage of technology developments that offer increased speeds can be difficult. The diode lasers used in transmitters tend to account for much of the cost of a transmitter. In addition, in some operating conditions, diode laser lifetime can be shorter than desirable, and laser diode replacement is required. For at least these reasons, alternative approaches are needed.

DETAILED DESCRIPTION

Figure 1:
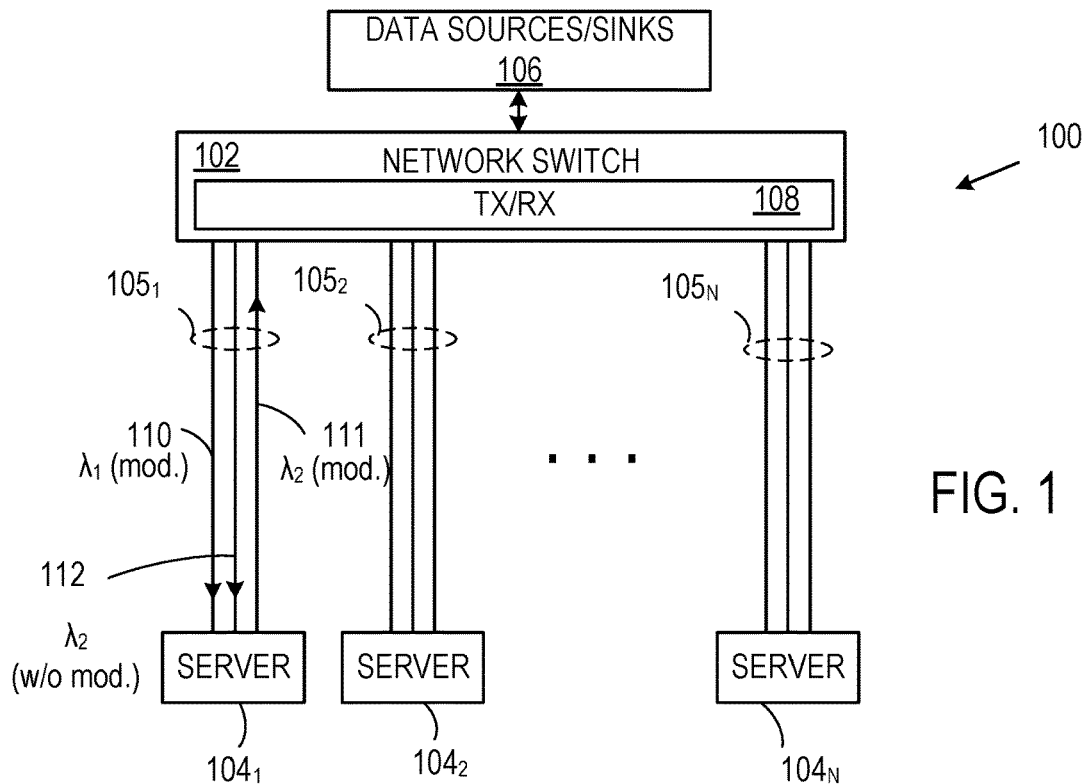
FIG. 1 illustrates a network switch coupled to deliver a base signal to a plurality of servers for remote modulation.

Disclosed herein are methods and apparatus that pertain to local and remote transmitter/receivers (transceivers) that are coupled with one or more waveguides for communication of modulated communication signals as well as delivery of portions of a base signal to one or more remote transmitters for remote modulation. The remote transmitters then direct the remotely modulated base signals to a preferred destination. In typical examples, the base signal is an optical signal produced with a diode laser or other laser. According to typical examples, lasers or other sources are not required at remote transmitters, substantially reducing communication system costs and complexity, and increasing reliability and serviceability. In some cases, an additional waveguide (such as an optical fiber) is provided to distribute base signals to remote transmitters (or transceivers). In some cases, each remote transceiver is coupled via a first waveguide that receives incoming modulated signals, a second waveguide that transmits the remotely modulated base signal to the preferred destination (typically a location associated with generation of the base signal), and a base waveguide that couples the base laser portion to the remote transmitter. In some cases, more or fewer waveguides can be used, and multiple signals can be suitably coupled using one or two waveguides. Remote transmitters include modulators that are situated to modulate base signal portions to communicate various data.

To improve reliability, additional base signal generators can be provided at various locations in a network, and situated to deliver base signal portions as needed in response to failure of a particular base signal generator such as, for example, failure of a laser diode. Distribution of base signals from these additional base signal generators may require additional waveguide beam combiners. Although such configurations are somewhat more complex (and may attenuate base signal powers available), these configurations can improve overall system availability and redundancy that is otherwise difficult or impossible to achieve. In some cases, two different base signal frequencies are used and the base signal can be provided to a remote transmitter by coupling to a common waveguide that is also coupled to modulated signals. In some cases, three waveguides are used for transmitting modulated signals to a remote transceiver, receiving modulated signals from the remote transceiver, and delivery of the base signal portion to the remote transceiver. However, in other examples, one or two waveguides can be used, and multiple signals are coupled to a common waveguide.

In at least some of the disclosed embodiments, a single base laser is used to provide a laser signal for optical communications to multiple devices within a computing network. For example, a single base laser can provide a laser signal to a network switch and to one or more server computers coupled to the switch.

The examples below are generally described with reference to optical communications that use optical waveguides such as optical fibers, and lasers that generate base signals. However, electrical waveguide systems can be used as well, and some examples can use combinations of optical and electrical signals and waveguides.

Such optical systems can require slightly increased optical power produced by a base laser so that adequate power can be distributed to remote nodes. However, this slightly increased power permits reduced cost and complexity in transceivers at remote locations (such as remote servers). Moreover, by providing a base laser at a particular network location, components at other locations can be CMOS based and not require differential silicon that is typically required. As used herein, a base signal is an optical or electrical signal that is distributed for remote modulation. In some cases, base signals are referred to as being communicated by base waveguides such as optical fibers. Base signals can be optical or electrical, and can be produced by lasers, LEDs, or electrical signal generators.

As used in this application and in the claims, the singular forms "a," "an," and "the" include the plural forms unless the context clearly dictates otherwise. Additionally, the term "includes" means "comprises." Further, the term "coupled" does not necessarily exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to remote and local network locations for convenience, but such network locations need not be distant. Such terminology is used to provide convenient description of communications between different locations or devices, even if mounted in a common frame or rack.

The term "signal" as used herein refers to propagating electromagnetic radiation such as optical radiation, microwave radiation, or millimeter wave radiation. Signals that include modulations associated with data to be transmitted are referred to as modulated signals. In the examples described below, a base signal is distributed to a plurality of local or remote nodes for subsequent modulation based on one or more selected data sources. While such a base signal can be an unmodulated optical or other signal, the base signal can be time varying or otherwise modulated, and an additional modulation applied. In some examples, a modulated optical signal received by a remote node can be detected to extract data, and portions thereof modulated to carry additional data, and thus serve as a base signal.

In many examples, optical waveguides such as optical fibers are used, but other optical waveguides defined in glass, plastics, semiconductors, or other media can be used. Multimode, single mode, few mode, single clad, double clad, or other optical fibers can be used. Waveguides for millimeter waves can also be used. In some cases, such waveguides are formed of plastic or polymers and are suitable for frequencies between about 10 GHz to 500 GHz, 30 GHz to 300 GHz, or 50 GHz to 150 GHz, or other frequencies. Typical examples are plastic fibers having circular, oval, elliptical, rectangular, polygonal or other cross-sections, and can be hollow or filled. Suitable waveguide materials include, for example, polypropylene, polystyrene, polyethylene or tetrafluoroethylene fluoropolymer fibers having cross-sectional dimensions of 10 mm, 5, mm, 3 mm, 2 mm, 1 mm, or less. One example is a hollow, circular cross-section Teflon waveguide with outer diameter of 2 mm and inner diameter of 1 mm. In some examples, metal clad dielectric waveguides are used with electrical signals.

As used herein, an optical fiber cable refers to one or more optical fibers and in some cases, multiple optical fibers are coupled to form a fiber bundle for convenient connection. In some examples, communication directions are referred to as up and down, uplink and downlink, or upstream and downstream for purposes of illustration. No particular directionality is implied, and these terms are used only to distinguish communications to and from various network nodes. In other examples, particular networked devices such as switches are referred to as "top of rack switches." Such switches generally connect directly to one or more servers with dedicated connections, including waveguides for data communication. A top of rack switch can be mounted in a physical rack with the related servers, but other arrangements can be used.

Optical modulators based on the electro-optic effect, acousto-optic effect, electro-absorption, or others can be used, and can provide amplitude, phase, frequency, or other types of modulations. In some cases, waveguide modulators are preferred, but bulk devices can be used. Optical fibers can be bundled into cables and connectorized to facilitate connections. As noted above, mm-wave or microwave components (waveguides, power splitters, couplers, frequency dependent couplers) can be used as well, although the examples are described with reference to optical communications.

Optical devices that divide optical beams into multiple beam portions are referred to herein as beam splitters, and can be implemented as beam splitter cubes, fiber couplers, planar waveguide couplers, diffraction gratings, or other waveguide or non-waveguide optical components.

With reference to FIG. 1, a data network 100 includes a network switch 102 that is coupled to servers $104_1, \ldots 104_N$, wherein N is a positive integer, with respective optical fiber cables $105_1, \ldots 105_N$. In some embodiments the network switch 102 is a top-of-rack (TOR) switch that is in a server rack with the servers $104_1, \ldots 104_N$. The network switch 102 is also coupled to a plurality of data sources/sinks 106 which can include other network switches, servers, local area networks, wide area networks, database systems, or other data processing, storage, and communication systems. The network switch 102 includes a transmitter/receiver (transceiver) 108 that permits communication between some or all of the servers $104_1, \ldots 104_N$ and some or all of the data sources/sinks 106. The transceiver 108 may include multiple dedicated transceivers so that each of the servers $104_1, \ldots 104_N$ is coupled to the network switch 102 with a selected transceiver. It is typically convenient that all dedicated transceivers are the same or similar, but different transceiver types and configurations (such as, for example, data rate and modulation format) can be used for communication with some or all of the servers $104_1, \ldots 104_N$.

In some cases, the transceiver 108 comprises a plurality of receivers, each receiver typically including photodetector and an associated electrical amplifier and assigned to a particular data channel or data source. For convenient description, additional receiver-side circuitry such as decoding, encoding, buffering, and timing circuitry and components are not shown. The transceiver 108 can also include a plurality of transmitters that include directly modulatable signal sources (such as laser diodes) or modulators for modulating a signal (such as an electrical or optical signal) assigned to particular data channels or data sources. Components such as those associated with channel assignments, encoding, modulation formats, and modulator drive are not illustrated.

The optical fiber cables 105$_1$, . . . 105$_N$ include a first optical fiber for data communication from the network switch 102 to a respective server, a second optical fiber for data communication from the server to the network switch 102, and a third optical fiber for transmitting a base (optical) signal to the server. For example, the server 104$_1$ is coupled to the network switch 102 with optical fibers 110, 111, 112 which are used for modulated optical signals from the network switch 102 (optical fiber 110), modulated optical signals from the server 104$_1$ to the network switch 102 (optical fiber 111, and a base signal from the network switch (optical fiber 112). As discussed below, the server 104$_1$ receives the base signal, modulates the base signal (or a portion thereof), and directs a modulated signal to the fiber 111.

In the example of FIG. 1, communication between a network switch and a plurality of servers is illustrated but communication can be similarly arranged between or among multiple servers, network switches, data sources, data sinks, or other network nodes of any kind. In addition while the optical fibers 110-112 are shown as dedicated to particular signals, in typical examples a common optical fiber type is used, and any of the optical fibers can be used for up or down communications, or to deliver the base signal. Additional or fewer optical fibers can be provided in the optical fiber cables 105$_1$, . . . 105$_N$, and each of the optical fiber cables can be the similar or different.

In the example of FIG. 1, the optical fiber 110 is illustrated as delivering a communication signal at a wavelength $\lambda_1$ to the server 104$_1$, the optical fiber 112 delivers the base signal at a wavelength $\lambda_2$ to the server 104$_1$, and the optical fiber 111 returns a communication signal (i.e., a modulated portion of the base signal) at the wavelength $\lambda_2$ to the network switch 102. The wavelengths $\lambda_1$ and $\lambda_2$ can be the same or different.

Figure 2:
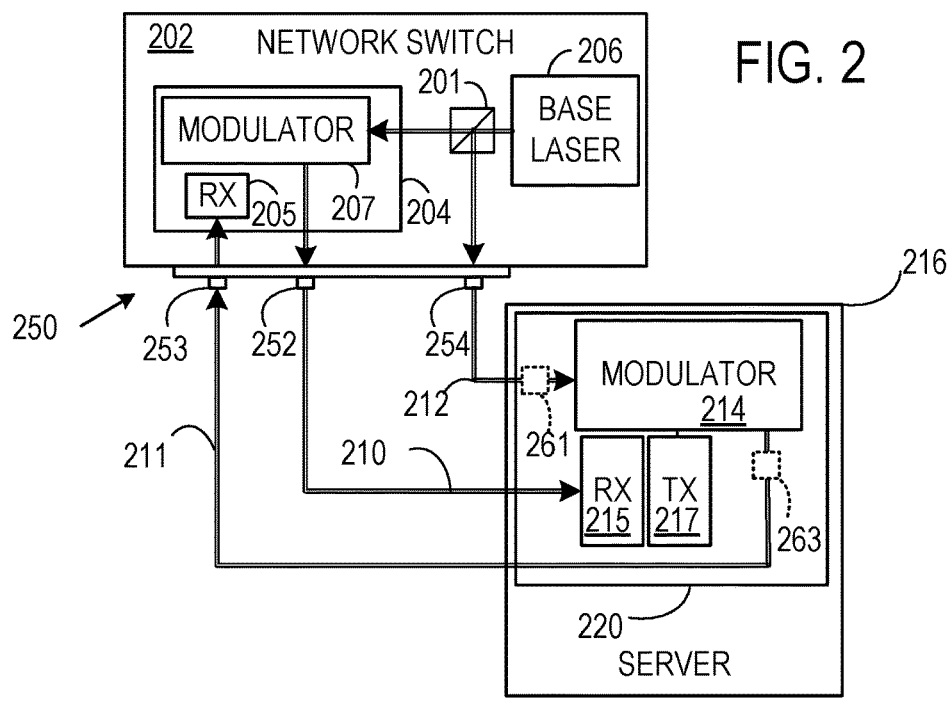
FIG. 2 illustrates a network switch coupled to deliver a base signal to a representative server for remote modulation.

Referring to FIG. 2, a network switch 202 includes a transceiver 204 and a base laser 206. The transceiver 204 includes a receiver 205 and a modulator 207 that is situated to receive a portion of a base signal from the base laser 206 via a beam splitter 201. The modulator 207 is situated to direct modulated signals to a receiver 215 at a server 216 with a first fiber 210 and receive modulated signals from a modulator 214 situated as the server 216 via a second fiber 211. The base laser 206 directs a portion of the base signal to the modulator 214 at the server 216 via a third fiber 212. The modulator 214 is coupled apply a modulation based on data received by a transmitter 217. As shown in FIG. 2, a transceiver 220 situated at the server 216 includes the receiver 215, the transmitter 217, and the modulator 214. The transmitter 217 generally processes incoming data to produce electrical signals suitable for driving the modulator 214. The transceiver 220 does not include an optical signal source to use in directing modulated optical signals to the network switch 202; instead, the base signal from the base laser 206 is used. While FIG. 2 shows only a single server 216, typically a plurality of servers or other nodes receive portions of the base signal produced by the base laser 206.

In some examples, the network switch 202 can include multiple base lasers that provide base signals to selected (or all) servers.

In some examples, optical amplifiers can be used to increase beam powers. As shown in FIG. 2, optical amplifiers such as optical amplifier 261 and optical amplifier 263 are situated to increase power in modulated signals directed from the server 216 to the network switch 202.

For convenient connection, a connector optical connector assembly 250 includes optical connectors 252-254 for respective optical fibers 210-212. These can be part of a common connector assembly, individual connectors secured to a mechanical support, or individual connectors. While typically a transceiver such as the transceiver 204 is coupled to a single server for communication with the fibers 252, 253, in some examples, the transceiver 204 transmits to and receives from different servers or network nodes.

Figure 3:
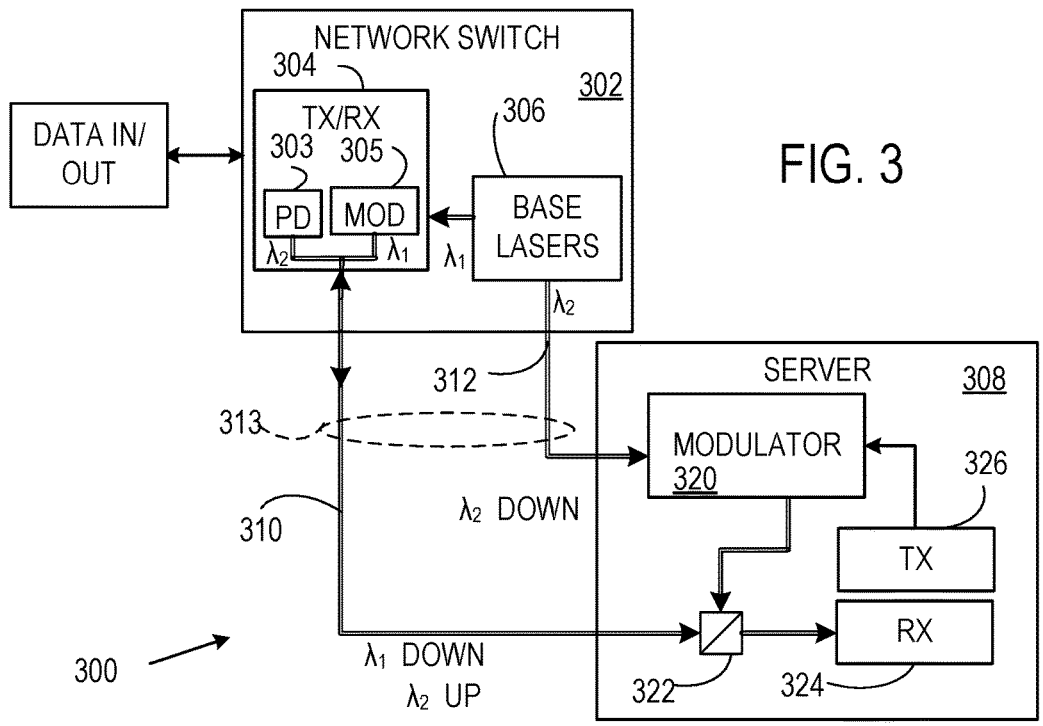
FIG. 3 illustrates a network switch coupled to deliver a base signal to a representative server for remote modulation using two optical fibers.

In the examples of FIGS. 1-2, dedicated fibers are provided for communication in each direction and for base signal distribution. However, as shown in FIG. 3, fewer optical fibers can be used. Referring to FIG. 3, a network 300 includes a network switch 302 having transceiver 304 configured to transmit at a first wavelength ($\lambda_1$) and receive at a second wavelength ($\lambda_2$) that is generally different from the first wavelength and base lasers 306 that produce base signals at the first wavelength and the second wavelength. The transceiver 304 typically includes a photodiode (PD) 303 situated to receive modulated optical signals at the second wavelength and an optical modulator 305 situated receive a base signal from the base lasers 306 at the first wavelength and to transmit a modulated signal at the first wavelength. The transceiver 304 transmits and receives modulated optical signals via a first fiber 310 and the base lasers 306 direct a base signal at the second wavelength to a server 308 via a base fiber 312. The first fiber 310 and the base fiber 312 can be arranged in a fiber bundle 313 for convenient connection, if desired.

The server 308 includes a modulator 320 that receives the base signal from the base fiber 312 and produces a modulated optical signal that is directed to a beam splitter 322 that in turn directs at least a portion of the modulated optical signal to the first fiber 310. Modulation applied by the modulator 320 is responsive to an electrical signal received from a transmitter 326. The beam splitter 322 also receives a modulated optical signal from the first fiber 310 and directs at least a portion thereof to a receiver 324. The beam splitter 322 can be wavelength independent so that only some beam portions of the up-directed and down-directed modulated signals are coupled to the first fiber 310 and the receiver 324, respectively. However, a dichroic beam splitter can be used that preferentially directs a modulated optical beam at the second wavelength to the first fiber 310 and the modulated optical beam at the first wavelength to the receiver 324. The beam splitter 324 is shown as a beam splitter cube that preferentially reflects at the second wavelength and transmits at the first wavelength, but in other examples, a beam splitter cube preferentially reflects at the first wavelength and transmits at the second wavelength. In typical examples, fiber couplers are used that can be wavelength independent or wavelength dependent, but wavelength dependent coupler can provide lower signal loss. In other examples, the transmitter 304 and the base lasers 306 are situated so that the modulated base signal from the modulator 320 and the down-directed modulated signal have different states of polarization and the beam splitter 322 (or fiber coupler) can be polarization dependent such as a polarizing beam splitter.

Figure 4:
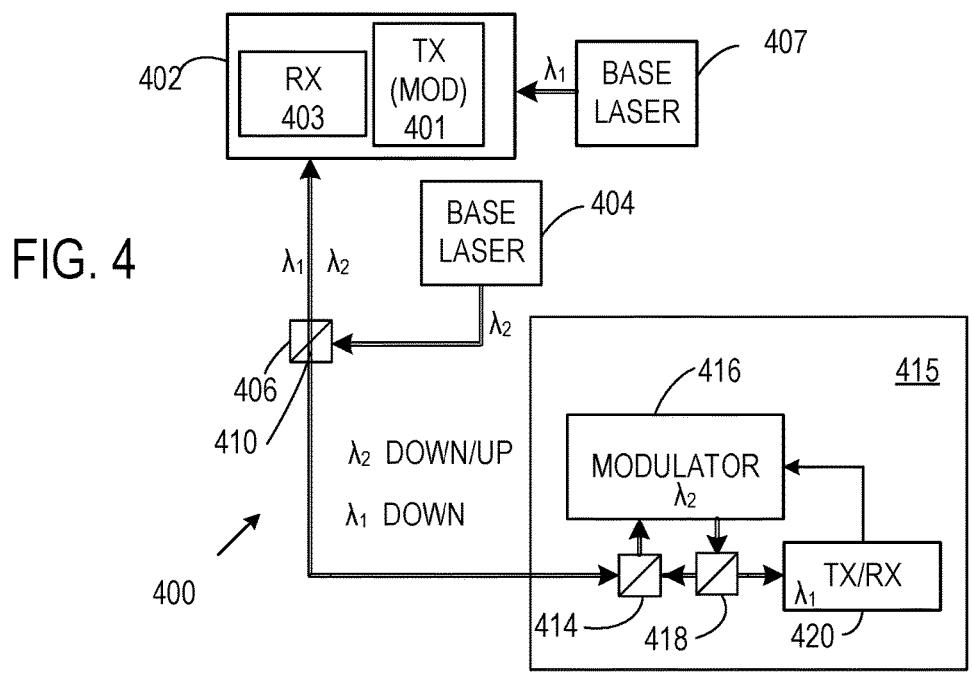
FIG. 4 illustrates a network switch coupled to deliver a base signal to a representative server for remote modulation using a single optical fiber.

In another example illustrated in FIG. 4, a network 400 includes a transceiver 402 that includes a transmitter 401 that is coupled to transmit at a first wavelength and a receiver 403 that is coupled to receive at a second wavelength. A base laser 404 produces a base signal at the second wavelength, and the base signal is directed by a beam splitter or coupler 406 to a server 415 via an optical fiber 410. A base laser 407 produces a base signal at a first wavelength and a down-directed modulated optical signal at the first wavelength from the transmitter 401 is directed to the server 410 via the optical fiber 410. The server 415 includes a first beam splitter 414 that directs the base signal (or a portion) to a modulator 416, and a second beam splitter 418 that directs a modulated optical beam at the second wavelength to the first beam splitter 414 and then to the optical fiber 410. The modulated optical beam at the first wavelength from the transceiver 402 is coupled to a transmitter/receiver 420 that also produces a modulated electrical signal that is provided to the modulator 416. The configuration of FIG. 4 can use wavelength (or polarization) dependent or independent beam splitters and fiber couplers to control losses.

Figure 5:
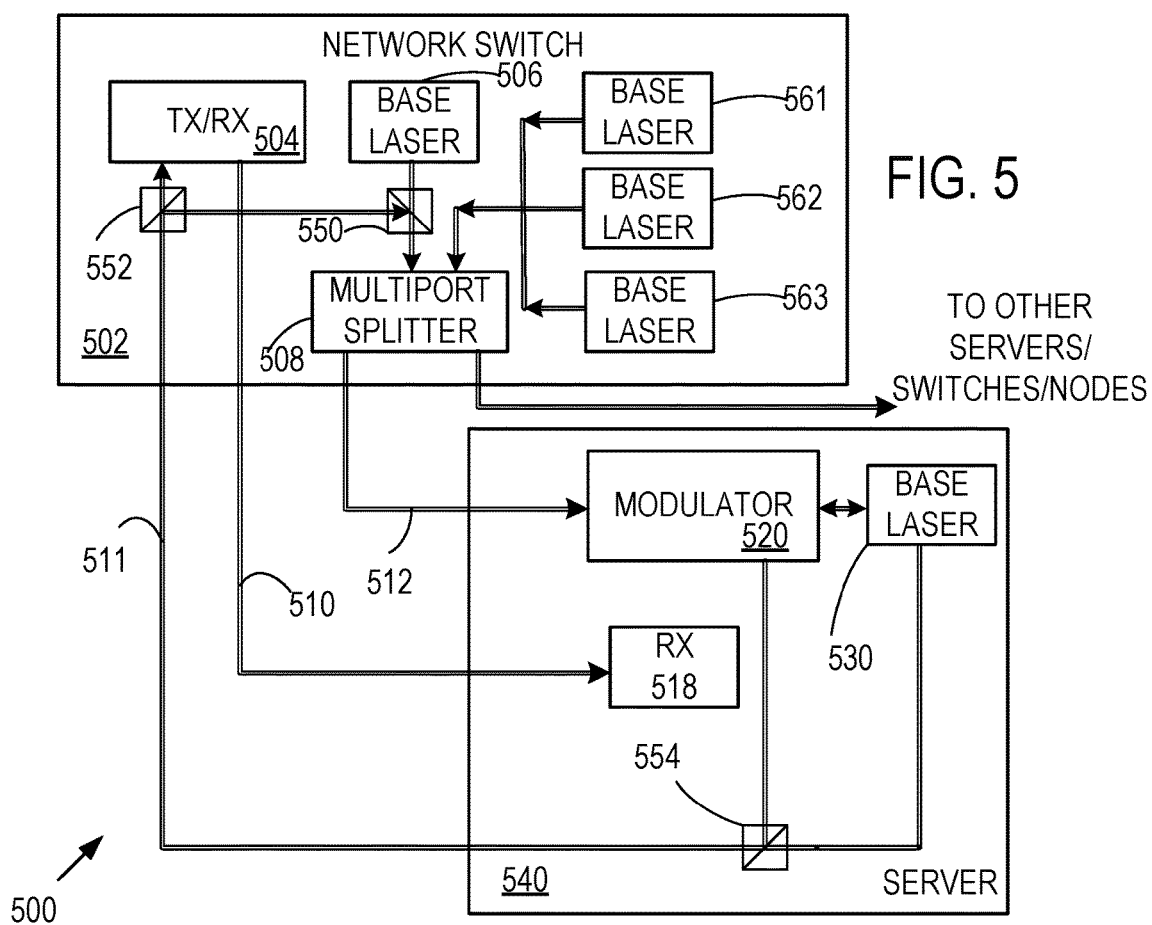
FIG. 5 illustrates a network switch coupled to deliver a base signal to a representative server that includes a secondary base laser.

In further example shown in FIG. 5, a network 500 includes a network switch 502 that includes a transceiver 504, a base laser 506, and a multiport splitter 508. The transceiver The transceiver 504 communicates a modulated signal to a server 540 via an optical fiber 510 and receives a modulated optical signal produced by a modulator 520 that is included at the server 540 via an optical fiber 511. A portion of a base signal from the base laser 506 is directed to the server 540 via a multiport splitter 508 and an optical fiber 512 for use by the modulator 520. The multiport splitter 508 produces multiple base signal portions that can be directed to a plurality of destinations such as servers, switches or other network nodes.

In the example of FIG. 5, a secondary base laser 530 is provided in the server 540. Such a base laser can provide redundancy in case of failure of the base laser 506. One or more beam splitters or fiber couplers 550, 552, 554 are situated to direct a second base signal to the multiport splitter 508 for distribution. In some networks, one or a few network nodes can include such secondary base lasers. Additional base lasers such as base lasers 561-563 can be included at the network switch 502, and assigned to selected servers or transmitters/modulators, or reserved for use in case of failure of other base lasers.

A secondary base laser can be coupled to one or more or any of the optical fibers connected to the server 540, or an additional fiber can be provided. The secondary base signal can be more efficiently coupled in most cases if a preferred wavelength or state of polarization is selected. Beam splitters such a cube beam splitters and fiber couplers are shown, but circulators can be used as well.

Figure 6:
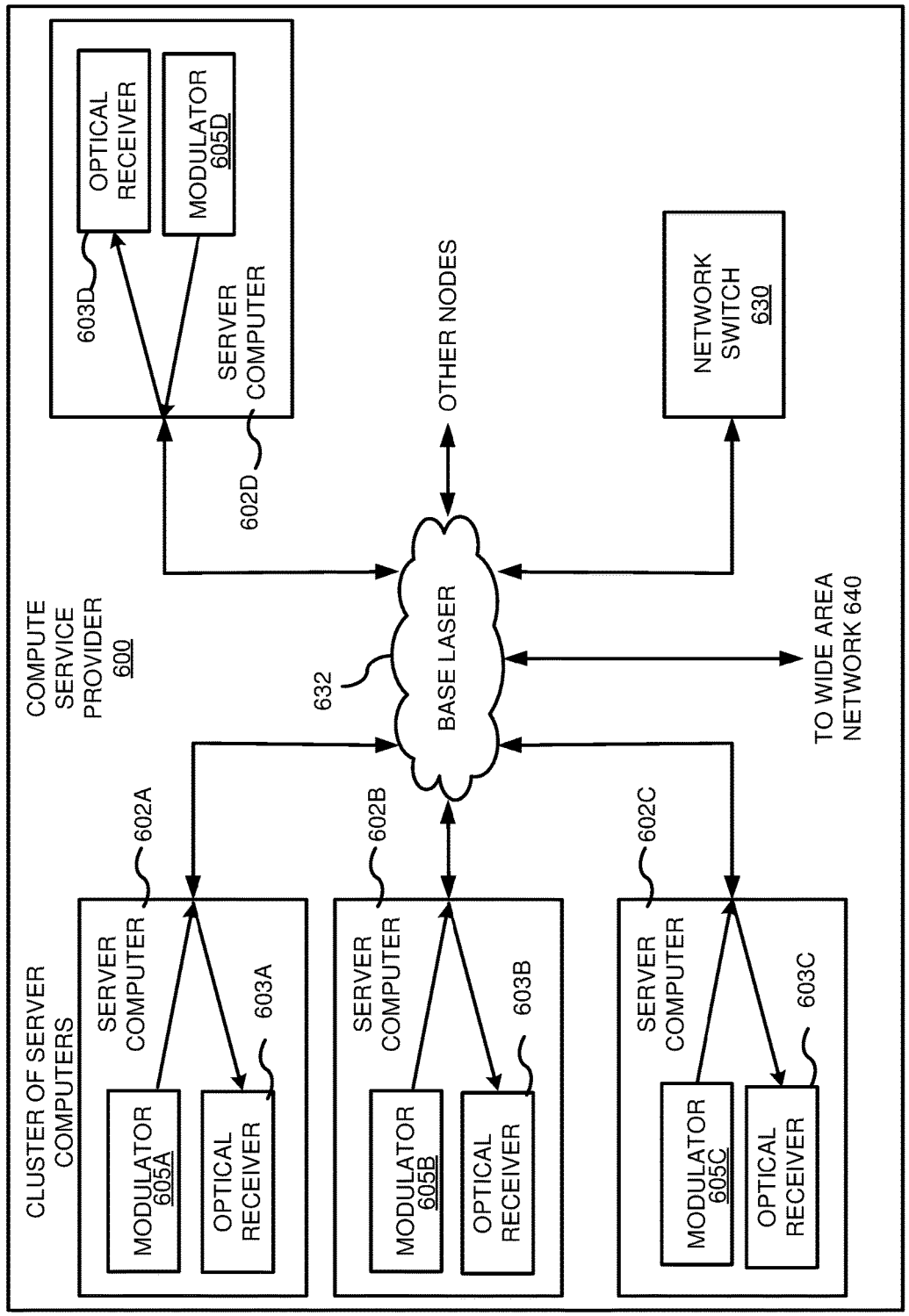
FIG. 6 illustrates a representative computer services provider network.

FIG. 6 is a computing system diagram of a computer network, such as that used by a network-based compute service provider 600 that illustrates one environment in which embodiments described herein can be used. By way of background, the compute service provider 600 (e.g., a cloud-computing provider or other network operator) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. As shown, each of the four server computers 602A-602D includes a respective optical receiver 603A-603D and a respective optical modulator 605A-605D.

A network switch 630 is coupled to a base laser 632 that provides base signal portions to the servers 602A-602D and the network switch 630. The network switch 630 can be used to interconnect the server computers 602A-602D and other network nodes. The base laser 632 provides the base optical signal that is modulated at the server computers 602A-602D and the network switch 630. The network switch 632 can be part of a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

Figure 7:
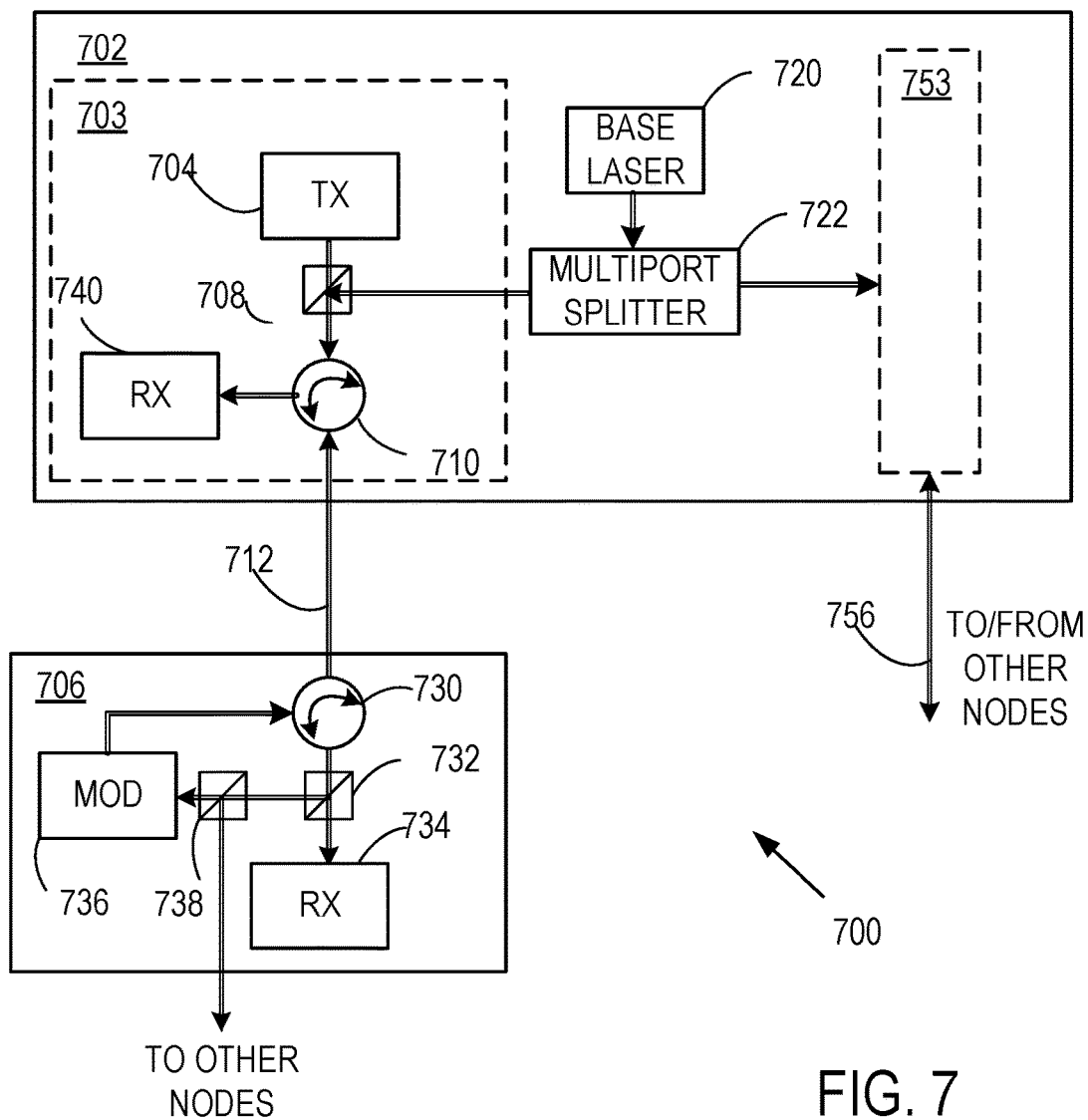
FIG. 7 illustrates a network switch coupled to deliver a base signal using optical circulators.

FIG. 7 illustrates a representative network 700 that includes a single optical fiber that communicates modulated signals upstream and downstream and a base signal for remote modulation. A network switch 702 includes an optical transmitter 704 that directs a modulated optical signal to a dichroic beam splitter 708 and to an optical circulator 710. The optical circulator 710 directs the modulated optical beam to a fiber 712 that is coupled to a server 706. The network switch 702 also includes a base laser 720 that is coupled to a multiport splitter 722 to direct portions of an optical signal to the dichroic beam splitter 708 and one or more additional servers or other nodes 753. The optical circulator 710 routes the base laser portion from the dichroic beam splitter 708 to the optical fiber 712.

The server 706 includes an optical circulator 730 that directs the base laser portion and the modulated optical signal from the transmitter 704 to a dichroic beam splitter 732. The modulated optical signal is then coupled to an optical receiver 734 while the base laser portion is directed to an optical modulator 736. The optical modulator 736 is situated to modulate the base laser portion and direct the modulated base laser portion to the optical circulator 730 which in turn directs the modulated base laser portion to the optical fiber 712 and the optical circulator 710 for delivery to a receiver 740.

A beam splitter 738 can be coupled to direct a portion of the base signal to additional networks nodes such as servers or switches as convenient. Additional servers or nodes can be coupled to the network switch 702 with one or more optical fibers such optical fiber 756. The arrangement of FIG. 7 uses a single fiber to communicate with a selected server, but one, two, three or more fibers can be used.

Figure 8:
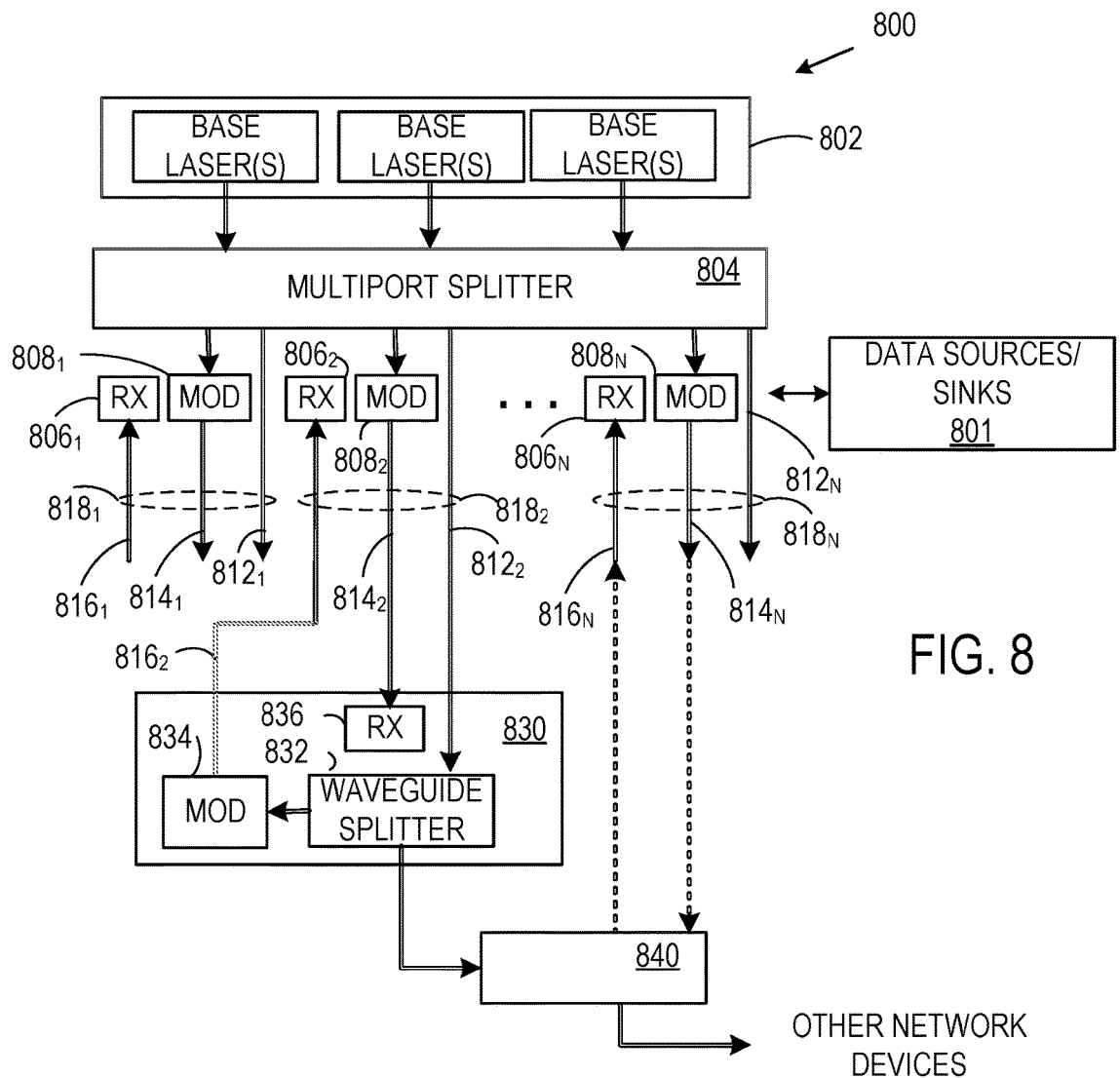
FIG. 8 illustrates a network switch coupled to deliver a base signal to a plurality of servers that can further distribute the base signal to additional servers or other networked devices.

In another example illustrated in FIG. 8, a network 800 includes a plurality of base lasers 802 that are coupled to a multiport beam splitter 804 that directs beam portions of at least one of the base lasers to modulators $808_1, \ldots, 808_N$ which in turn couple modulated optical signals to output optical waveguides $814_1, \ldots, 814_N$. Other base signal portions are directed to base signal optical waveguides $812_1, \ldots, 812_N$ that are coupled to deliver base signal portions to one or more networked devices such as a server 830. The server 830 and other networked devices are coupled to respective receiver such as receivers 806$_1$, ..., 806N with optical fibers 816$_1$, ..., 816$_N$. The server 830 includes a modulator 834 that is coupled to receive a base signal portion, a receiver 836, and a waveguide beam splitter 832 that directs the base signal portion to the modulator 834 and directs an additional base signal portion to another network device 840 such as a server or switch. Additional devices can be situated to receive the base signal from the network device 840. Various data sources and data sinks 801 can supply data for modulation of the base signal portions and receive data from one or more receivers. As shown in FIG. 8, the waveguide 812$_1$, ..., 812$_N$, 814$_1$, ..., 814$_N$, 816$_1$, ..., 816$_N$ are shown as fiber bundles 818$_1$, ..., 818$_N$.

Distribution of base signals can be arranged serially, from one network node to another, and in some examples, network nodes can be arranged in a ring architecture and base signals distributed around the ring. Communication signals and base signals can be optical or electrical, and hybrid systems can use combinations thereof. For example, a base optical signal can be used to produce a modulated uplink communication signal in a system in which an electrical waveguide is used for downlink communications.

In view of the many possible embodiments to which the principles of the disclosed technology may be applied, it should be recognized that the illustrated embodiments are only examples and should not be taken as limiting the scope of the disclosure. We therefore claim all that comes within the scope of the appended claims.

What is claimed is:

1. A network device, comprising:
   a transmitter;
   a receiver;
   a base signal generator; and
   at least one waveguide coupled to the transmitter to receive a plurality of output modulated signals from the transmitter, coupled to the receiver to direct a plurality of input modulated signals to the receiver, and coupled to the base signal generator to output a plurality of base signal portions, wherein the at least one waveguide includes a plurality of first waveguides, each of the first waveguides coupled to the transmitter so as to transmit a respective output modulated signal of the plurality of output modulated signals, a plurality of second waveguides, each of the second waveguides coupled to the receiver so as to direct a respective input modulated signal of the plurality of input modulated signals to the receiver, and a plurality of third waveguides, each of the third waveguides coupled to output a respective base signal portion from the base signal generator.

2. The network device of claim 1, wherein the at least one waveguide includes a plurality of first waveguides, each of the first waveguides coupled to the transmitter so as to transmit a respective output modulated signal of the plurality of output modulated signals.

3. The network device of claim 1, wherein the at least one waveguide includes a plurality of second waveguides, each of the second waveguides coupled to the receiver so as to direct a respective input modulated signal of the plurality of input modulated signals to the receiver.

4. The network device of claim 1, wherein the at least one waveguide includes a plurality of base waveguides, each of the base waveguides coupled to output a respective base signal portion from the base signal generator.

5. The network device of claim 1, wherein the base signal generator is an electrical signal generator, the second waveguides and the third waveguides are electrical waveguides, and the input modulated signals are electrical signals.

6. The network device of claim 5, wherein the first waveguides, the second waveguides, and the third waveguides are metal clad dielectric waveguides.

7. The network device of claim 1, wherein the base signal generator is a laser, the second waveguides and the third waveguides are optical waveguides, and the input modulated signals are optical signals.

8. The network device of claim 7, wherein the first waveguides are optical waveguides, and the output modulated signals are optical signals.

9. The network device of claim 8, wherein the first waveguides, the second waveguides, and the third waveguides are optical fibers.

10. The network device of claim 9, wherein the transmitter comprises a laser coupled to produce the output modulated signals that are delivered to the corresponding first waveguides and the receiver comprises a photodetector coupled to receive the input modulated signals from the plurality of second waveguides.

11. The network device of claim 10, wherein:
   the receiver comprises a plurality of photodetectors coupled to receive the input modulated signals from corresponding second waveguides of the plurality of second waveguides; and
   the transmitter comprises a plurality of lasers coupled to produce the output modulated signals that are delivered to respective first waveguides of the plurality of first waveguides.

12. The network device of claim 9, further comprising an optical beam splitter coupled to the base signal generator so as to couple portions of the base signal to each of the third waveguides.

13. The network device of claim 12, wherein the transmitter includes a modulator coupled to the base signal generator and situated to produce the output modulated signals by modulating a portion of the base signal from the base signal generator.

14. A method, comprising:
   distributing portions of a base signal to a first modulator in a first computing device and to a second modulator in a second computing device via a first base waveguide and a second base waveguide, respectively;
   at the second computing device, distributing a portion of the base signal to a third computing device via a third base waveguide;
   at each of the first and second modulators, modulating at least portions of the received portion of the base signal to produce a first remote modulated signal and a second remote modulated signal, respectively; and
   transmitting the first and second modulated signals from each of the first and second modulators.

15. The method of claim 14, further comprising directing a first local modulated signal and a second local modulated signal to a first receiver associated with the first computing device and a second receiver associated with the second computing device, respectively.

16. The method of claim 15, wherein the first local modulated signal and second local modulated signal are directed to the first computing device and the second computing device via the first base waveguide and the second base waveguide, respectively.

17. The method of claim 16, wherein the base signal is an optical signal and the first and second base waveguides, the first and second downlink waveguides, and the first and second downlink waveguides are optical waveguides.

18. The method of claim 15, wherein the first local modulated signal and the second local modulated signal are directed to the first computing device and the second computing device via a first downlink waveguide and a second downlink waveguide, respectively.

19. The method of claim 15, further comprising coupling the first remote modulated signal and the second remote modulated signal produced by the first modulator and the second modulator to a first uplink waveguide and a second uplink waveguide, respectively.

* * * * *